United States Patent
Kawasaki et al.

(10) Patent No.: US 12,486,393 B2
(45) Date of Patent: Dec. 2, 2025

(54) COMPOSITION FOR FLUORINE RUBBER CROSSLINKING AND MOLDED ARTICLE

(71) Applicant: DAIKIN INDUSTRIES, LTD., Osaka (JP)

(72) Inventors: Kazuyoshi Kawasaki, Osaka (JP); Kouhei Takemura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 460 days.

(21) Appl. No.: 18/165,519

(22) Filed: Feb. 7, 2023

(65) Prior Publication Data

US 2023/0183465 A1    Jun. 15, 2023

Related U.S. Application Data

(63) Continuation of application No. PCT/JP2021/032997, filed on Sep. 8, 2021.

(30) Foreign Application Priority Data

Sep. 18, 2020 (JP) ................. 2020-157766
Jul. 5, 2021 (JP) ................. 2021-111538
Aug. 19, 2021 (JP) ................. 2021-134042

(51) Int. Cl.
| | | |
|---|---|---|
| C08L 27/16 | (2006.01) | |
| C08K 5/07 | (2006.01) | |
| C08K 5/13 | (2006.01) | |
| C08K 5/41 | (2006.01) | |
| C08K 5/42 | (2006.01) | |

(52) U.S. Cl.
CPC .............. *C08L 27/16* (2013.01); *C08K 5/07* (2013.01); *C08K 5/13* (2013.01); *C08K 5/41* (2013.01); *C08K 5/42* (2013.01); *C08L 2205/06* (2013.01)

(58) Field of Classification Search
CPC .......... C08K 5/053; C08K 5/07; C08L 27/16; C08L 27/12
See application file for complete search history.

(56) References Cited

U.S. PATENT DOCUMENTS

| | | | | |
|---|---|---|---|---|
| 3,243,411 A | * | 3/1966 | Tawney | ........ C08K 5/053 |
| | | | | 525/326.3 |
| 3,876,654 A | * | 4/1975 | Pattison | ........ C08K 5/50 |
| | | | | 525/326.3 |
| 4,233,421 A | | 11/1980 | Worm | |
| 4,446,270 A | | 5/1984 | Guenthner et al. | |
| 4,489,196 A | | 12/1984 | Schmiegel | |
| 5,086,123 A | | 2/1992 | Guenthner et al. | |
| 5,216,085 A | | 6/1993 | Guenthner et al. | |
| 5,319,025 A | | 6/1994 | Weigelt | |
| 2009/0082526 A1 | | 3/2009 | Higashira et al. | |
| 2009/0292034 A1 | * | 11/2009 | Tomomatsu | ........ C08L 69/00 |
| | | | | 521/134 |
| 2011/0184126 A1 | | 7/2011 | Takemura et al. | |
| 2011/0200777 A1 | | 8/2011 | Doi et al. | |
| 2013/0267662 A1 | | 10/2013 | Doi et al. | |
| 2017/0197389 A1 | | 7/2017 | Emori et al. | |
| 2018/0142050 A1 | | 5/2018 | Fantoni et al. | |

FOREIGN PATENT DOCUMENTS

| | | |
|---|---|---|
| EP | 0 155 639 B1 | 1/1990 |
| EP | 2 315 806 B1 | 3/2016 |
| EP | 4 317 284 A1 | 2/2024 |
| JP | 56-161448 A | 12/1981 |
| JP | 59-105046 A | 6/1984 |
| JP | 59-206451 A | 11/1984 |
| JP | 60-215042 A | 10/1985 |
| JP | 63-268757 A | 11/1988 |
| JP | 64-000418 B2 | 1/1989 |
| JP | 04-226555 A | 8/1992 |
| JP | 07-286081 A | 10/1995 |
| JP | 2011-522921 A | 8/2011 |
| JP | 2018-514627 A | 6/2018 |
| JP | 2018/115087 | * 7/2018 |
| TW | 201026768 A1 | 7/2010 |
| WO | 2002/092683 A1 | 11/2002 |
| WO | 2013/090642 A1 | 6/2013 |

OTHER PUBLICATIONS

Translation of JP2018115087 (Year: 2018).*
International Search Report for PCT/JP2021/032997 dated Nov. 2, 2021.
International Search Report for PCT/JP2021/032998 dated Nov. 2, 2021.
International Preliminary Report on Patentability dated Mar. 21, 2023 with translation of the Written Opinion in Application No. PCT/JP2021/032997.
International Preliminary Report on Patentability dated Mar. 21, 2023 with translation of the Written Opinion in Application No. PCT/JP2021/032998.
Extended European Search Report dated Sep. 19, 2024 in Application No. 21869262.2.
Extended European Search Reported dated Sep. 25, 2024 in Application No. 21869263.0.

* cited by examiner

Primary Examiner — Robert C Boyle
(74) Attorney, Agent, or Firm — Sughrue Mion, PLLC

(57) ABSTRACT

Provided is a fluoroelastomer crosslinkable composition, containing a polyol-crosslinkable fluoroelastomer (a) and a cross-linking agent (b), wherein the cross-linking agent (b) is at least one selected from the group consisting of a compound represented by the general formula (b) set forth in the description and a salt of the compound with an alkali metal, an alkaline earth metal, or an onium compound.

11 Claims, No Drawings

COMPOSITION FOR FLUORINE RUBBER CROSSLINKING AND MOLDED ARTICLE

CROSS-REFERENCE TO RELATED APPLICATIONS

This application is a Rule 53(b) Continuation of International Application No. PCT/JP2021/032997 filed Sep. 8, 2021, which claims priority based on Japanese Patent Application No. 2020-157766 filed Sep. 18, 2020, Japanese Patent Application No. 2021-111538 filed Jul. 5, 2021, Japanese Patent Application No. 2021-134042 filed Aug. 19, 2021, the respective disclosures of which are incorporated herein by reference in their entirety.

TECHNICAL FIELD

The present disclosure relates to a fluoroelastomer cross-linkable composition and a molded article.

BACKGROUND ART

Patent Document 1 discloses, as an essential component in the final curable composition, an aromatic polyhydroxy compound capable of acting as a cross-linking agent or an auxiliary curing agent for a fluorinated elastomer. One of the most useful aromatic polyphenols is a bisphenol compound, hexafluoroisopropylidene-bis(4-hydroxybenzene), known as bisphenol AF.

Patent Document 2 discloses a composition comprising a fluorocarbon elastomer gum, a fluoroaliphatic sulfonamide as a curing agent therefor, and a second curing agent selected from the group consisting of polyhydroxy compounds, polyamine compounds, and derivatives thereof.

Patent Document 3 discloses a composition comprising fluorocarbon elastomer gum and a vulcanizing agent therefor, wherein the vulcanizing agent is a composition comprising one or a mixture of aromatic compounds having hydroxy and oxyallyl groups directly bonded to aromatic ring-carbon atoms.

Patent Document 4 discloses a composition for fluoroelastomer vulcanizing, comprising (a) a fluorine-containing elastomer, (b) one or more substances selected from the group consisting of divalent metal oxides, divalent metal hydroxides and mixtures of these metal oxides or metal hydroxides with metal salts of weak acids, (c) a polyhydroxyaromatic compound, and (d) a specific vulcanization accelerator.

CITATION LIST

Patent Documents

Patent Document 1: Japanese Patent Publication No. 64-418
Patent Document 2: Japanese Patent Laid-Open No. 60-215042
Patent Document 3: Japanese Patent Laid-Open No. 59-105046
Patent Document 4: Japanese Patent Laid-Open No. 63-268757

SUMMARY

According to the present disclosure, there is provided a fluoroelastomer crosslinkable composition, comprising a polyol-crosslinkable fluoroelastomer (a); and a cross-linking agent (b), wherein the cross-linking agent (b) is at least one selected from the group consisting of a compound represented by the general formula (b) and a salt of the compound with an alkali metal, an alkaline earth metal, or an onium compound,

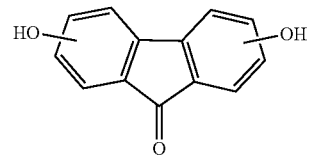

(b)

wherein a hydrogen atom bonded to two benzene rings is optionally replaced with any substituent not containing a halogen atom.

Effects

According to the present disclosure, it is possible to provide a fluoroelastomer crosslinkable composition containing a compound not containing a fluorine atom as a cross-linking agent and capable of obtaining a molded article with excellent compression set characteristics at high temperature.

DESCRIPTION OF EMBODIMENTS

Hereinafter, specific embodiments of the present disclosure will now be described in detail, but the present disclosure is not limited to the following embodiments.

A fluoroelastomer crosslinkable composition of the present disclosure contains a polyol-crosslinkable fluoroelastomer (a) and a cross-linking agent (b).

By using a crosslinkable composition containing bisphenol AF as a cross-linking agent, a molded article with excellent compression set characteristics at high temperature can be obtained. On the other hand, when bisphenol AF adheres to equipment used for weighing or preparing compositions, the cost burden is not small, as bisphenol AF is a compound containing fluorine atoms, and a dedicated incinerator is needed to clean bisphenol AF adhering to equipment and treat the resulting material.

Therefore, there is a demand for using, as a polyol cross-linking agent, a compound which is capable of obtaining a molded article with excellent compression set characteristics at high temperature, which does not contain a fluorine atom.

The fluoroelastomer crosslinkable composition of the present disclosure contains, as the cross-linking agent (b), at least one selected from the group consisting of a compound represented by the general formula (b) and a salt of the compound with an alkali metal, an alkaline earth metal, or an onium compound. These compounds are easy to handle because they do not contain a fluorine atom. Furthermore, it has been found that a molded article exhibiting compression set at a high temperature can be obtained from the fluoroelastomer crosslinkable composition containing the cross-linking agent (b),

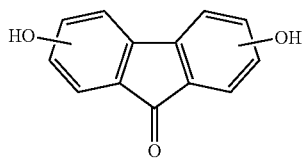

(b)

wherein a hydrogen atom bonded to two benzene rings is optionally replaced with any substituent not containing a halogen atom.

Hereinafter, each component of the fluoroelastomer cross-linkable composition of the present disclosure will be described.

(a) Polyol-Crosslinkable Fluoroelastomer

A polyol-crosslinkable fluoroelastomer used in the present disclosure is a fluoroelastomer having a polyol-crosslinkable site. Herein, the fluoroelastomer is an amorphous fluoropolymer. Being "amorphous" means that the size of a melting peak (ΔH) appearing in differential scanning calorimetry (DSC) (temperature-increasing rate 20° C./min) or differential thermal analysis (DTA) (temperature-increasing rate 20° C./min) of the fluoropolymer is 4.5 J/g or less. The fluoroelastomer exhibits elastomeric characteristics by being crosslinked. Elastomeric characteristics mean such characteristics that the polymer can be stretched, and retain its original length when the force required to stretch the polymer is no longer applied.

Examples of the polyol-crosslinkable site includes a site having a vinylidene fluoride (VdF) unit. Among fluoroelastomers, a fluoroelastomer containing a VdF unit is preferable because the effect of using the cross-linking agent (b) is easily demonstrated.

The fluoroelastomer having a polyol-crosslinkable site includes non-perfluoro fluoroelastomer and fluoroelastomers containing —CH$_2$— (methylene group) in the main chain. The fluoroelastomer having a polyol-crosslinkable site may be, for example, a fluoroelastomer based on vinylidene fluoride (VDF) substantially polar end group free disclosed in Japanese Patent Laid-Open No. 2003-277563 or a vinylidene fluoride-based fluoroelastomer containing repeating units derived from vinylidene fluoride (VDF) and repeating units derived from at least one additional (per)fluorinated monomer disclosed in Japanese Translation of PCT International Application Publication No. 2018-527449.

Examples of the fluoroelastomer having a polyol-crosslinkable site include a VdF-based fluoroelastomer and an elastomer having a polyol-crosslinkable functional site in a side chain and/or a main chain. Examples of the VdF-based fluoroelastomer include tetrafluoroethylene (TFE)/propylene/VdF-based fluoroelastomer, ethylene/hexafluoropropylene (HFP)/VdF-based fluoroelastomer, VdF/HFP-based fluoroelastomer, and VdF/TFE/HFP-based fluoroelastomer. These fluoroelastomers having a polyol-crosslinkable site can be used singly or in any combination thereof in the range of not impairing effects of the present disclosure.

The VdF-based fluoroelastomer is preferably one represented by the following general formula (1).

$$-(M^1)-(M^2)-(N^1)— \quad (1)$$

wherein the structural unit M is a structural unit derived from vinylidene fluoride (m$^1$); the structural unit M$^2$ is a structural unit derived from a fluorine-containing ethylenic monomer (m$^2$); and the structural unit N$^1$ is a repeating unit derived from a monomer (n$^1$) copolymerizable with the monomer (m$^1$) and the monomer (m$^2$).

Among the VdF-based fluoroelastomer represented by the general formula (1), preferred are those containing 30 to 85% by mol of the structural unit M$^1$ and 55 to 15% by mol of the structural unit M$^2$, and more preferred are those containing 50 to 80% by mol of the structural unit M$^1$ and 50 to 20% by mol of the structural unit M$^2$. The structural unit N$^1$ is preferably 0 to 20% by mol based on the total amount of the structural unit M and the structural unit M$^2$.

As the fluorine-containing ethylenic monomer (m$^2$), one or two or more kinds of the monomers can be utilized; and examples thereof include TFE, chlorotrifluoroethylene (CTFE), trifluoroethylene, HFP, trifluoropropylene, tetrafluoropropylene, pentafluoropropylene, trifluorobutene, tetrafluoroisobutene, perfluoro(alkyl vinyl ether) (PAVE), fluorine-containing monomers represented by the general formula (2):

$$CF_2=CFO(Rf^1O)_q(Rf^2O)_xRf^3 \quad (2)$$

wherein Rf$^1$ and Rf$^2$ are each independently a linear or branched perfluoroalkyl group having 1 to 6 carbon atoms; Rf$^3$ is a linear or branched perfluoroalkyl group having 1 to 6 carbon atoms; and q and r are each independently an integer of 0 to 6 (provided 0<q+r≤6), fluorine-containing monomers represented by the general formula (3):

$$CHX^{11}=CX^{12}Rf^4 \quad (3)$$

wherein one of X$^{11}$ and X$^{12}$ is H and the other thereof is F; and Rf$^4$ is a linear or branched fluoroalkyl group having 1 to 12 carbon atoms, and fluorine-containing monomers such as vinyl fluoride; but among these, TFE, HFP and PAVE are preferable.

The monomer (n$^1$) may be any one as long as being copolymerizable with the monomer (m$^1$) and the monomer (m$^2$), but examples thereof include ethylene, propylene, alkyl vinyl ethers, monomers providing a crosslinking site, and bisolefin compounds. These can be used singly or in any combination.

Such a monomer providing a crosslinking site includes iodine- or bromine-containing monomers represented by the general formula (4):

$$CY^1{}_2=CY^1—Rf^5CHR^1X^1 \quad (4)$$

wherein Y$^1$ is independently a hydrogen atom, a fluorine atom or —CH$_3$; Rf$^5$ is a fluoroalkylene group, a perfluoroalkylene group, a fluoropolyoxyalkylene group or a perfluoropolyoxyalkylene group; R$^1$ is a hydrogen atom or —CH$_3$; and X$^1$ is an iodine atom or a bromine atom, and monomers represented by the general formula (5):

$$CF_2=CFO(CF_2CF(CF_3)O)_m(CF_2)_n—X^2 \quad (5)$$

wherein m is an integer of 0 to 5, and n is an integer of 1 to 3; and X$^2$ is a cyano group, a carboxyl group, an alkoxycarbonyl group, a bromine atom or an iodine atom, and monomers represented by the general formula (6):

$$CH_2=CH(CF_2)_pI \quad (6)$$

wherein p is an integer of 1 to 10, and examples thereof include iodine-containing monomers such as perfluoro(6,6-dihydro-6-iodo-3-oxa-1-hexene) and perfluoro(5-iodo-3-oxa-1-pentene) as described in Japanese Patent Publication No. 05-63482 and Japanese Patent Laid-Open No. 07-316234, iodine-containing monomers such as CF$_2$=CFOCF$_2$CF$_2$CH$_2$I as described in Japanese Patent Laid-Open No. 04-217936, iodine-containing monomers such as 4-iodo-3,3,4,4-tetrafluoro-1-butene as described in Japanese Patent Laid-Open No. 61-55138, a bromine-containing monomer as described in Japanese Patent Laid-Open No. 04-505341, cyano group-containing monomers, carboxyl group-containing monomers and alkoxycarbonyl group-containing monomers as described in Japanese Patent Laid-Open No. 04-505345 and Japanese Patent Laid-Open No. 05-500070. These can be used singly or in any combination.

Those as described in Japanese Patent Laid-Open No. 08-12726 can also be used as the bisolefin compounds.

Specific and preferred examples of the VdF-based fluoroelastomer include VdF/HFP-based elastomer, VdF/HFP/TFE-based elastomer, VdF/TFE/PAVE-based fluoroelastomer, VdF/CTFE-based elastomer, and VdF/CTFE/TFE-based elastomer.

Examples of the elastomer having a polyol-crosslinkable functional site in a side chain and/or a main chain include an elastomer containing a copolymer unit comprising a cure site monomer represented by tetrafluoroethylene (TFE)/perfluoro(alkyl vinyl ether) (PAVE)/$R^1CH=CR^2R^3$, wherein $R^1$ and $R^2$ are independently selected from hydrogen and fluorine, and $R^3$ is independently selected from hydrogen, fluorine, alkyl and perfluoroalkyl), and an elastomer having double bonds in a side chain and/or a main chain, as described in Japanese Patent Laid-Open No. 60-44511 or Japanese Patent No. 3890630.

Among these, the polyol-crosslinkable fluoroelastomer is preferably a fluoroelastomer composed of VdF and at least one other fluorine-containing monomer, and is preferably at least one elastomer selected particularly from the group consisting of VdF/HFP-based fluoroelastomer, VdF/TFE/HFP-based fluoroelastomer and VdF/TFE/PAVE-based fluoroelastomer, and more preferably at least one elastomer selected from the group consisting of VdF/HFP-based fluoroelastomer and VdF/TFE/HFP-based fluoroelastomer.

In the fluoroelastomer, the Mooney viscosity (ML1+10 (100° C.)) at 100° C. is preferably 2 or higher, more preferably 10 or higher, still more preferably 20 or higher and particularly preferably 30 or higher; and is preferably 200 or lower, more preferably 150 or lower, still more preferably 120 or lower, and particularly preferably 100 or lower. The Mooney viscosity is a value measured according to ASTM D1646-15 and JIS K6300-1:2013.

In the fluoroelastomer, the fluorine content is preferably 50 to 75% by mass, more preferably 60 to 73% by mass, and still more preferably 63 to 72% by mass. The fluorine content is determined by calculation from the composition ratio of monomer units constituting the fluoroelastomer.

The fluoroelastomer preferably has a glass transition temperature of −50 to 0° C. The glass transition temperature can be determined by heating 10 mg of a sample at 20° C./min using a differential scanning calorimeter to obtain a DSC curve, and obtaining, as the glass transition temperature, a temperature indicating an intersection point of an extension of a baseline around the second-order transition of the DSC curve with a tangent of the DSC curve at the inflection point.

The fluoroelastomer described above can be produced by a conventional method.

(b) Cross-Linking Agent

The fluoroelastomer crosslinkable composition of the present disclosure contains a cross-linking agent. The cross-linking agent is at least one selected from the group consisting of a compound represented by the following general formula (b) and a salt of the compound with an alkali metal, an alkaline earth metal, or an onium compound.

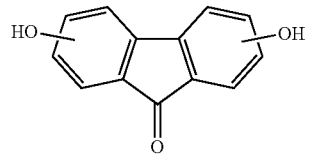

(b)

wherein a hydrogen atom bonded to two benzene rings is optionally replaced with any substituent not containing a halogen atom.

The compound represented by the general formula (b) has two —OH groups in total. The bond position of each group is not particularly limited, and each group can be bonded to any of four carbon atoms to which a substitutable hydrogen atom is bonded among six carbon atoms constituting the 6-membered ring.

The compound represented by the general formula (b) is preferably 2,6-dihydroxy-9H-fluoren-9-one, 3,6-dihydroxy-9H-fluoren-9-one, and 2,7-dihydroxy-9H-fluoren-9-one, and more preferably 2,7-dihydroxy-9H-fluoren-9-one.

The hydrogen atoms bonded to two benzene rings may or may not be replaced with substituents other than a hydroxy group, a halogen atom, and a group containing a halogen atom. The substituent is not limited as long as it is a substituent not containing a halogen atom, and examples thereof include a cyano group, an alkyl group having 1 to 10 carbon atoms, and an alkoxy group having 1 to 10 carbon atoms. The substituent is a substituent not containing a halogen atom such as a fluorine atom or a group containing a fluorine atom, and therefore, the compound represented by the general formula (b) does not contain a fluorine atom.

The cross-linking agent may be a salt of the compound represented by the general formula (b) with an alkali metal, a salt of the compound represented by the general formula (b) with an alkaline earth metal, or a salt of the compound represented by the general formula (b) with an onium compound. Among these salts, the salt of the compound represented by the general formula (b) with an onium compound is preferable. The salt of the compound with an onium compound is an onium salt composed of an anion moiety derived from the compound and a cation moiety derived from an onium compound. When an onium salt is used as the cross-linking agent (b), the onium salt functions not only as a cross-linking agent but also as a crosslinking accelerator.

The compound represented by the general formula (b), the salt of the compound represented by the general formula (b) with an alkali metal, the salt of the compound represented by the general formula (b) with an alkaline earth metal, or a salt of the compound represented by the general formula (b) with an onium compound may be used singly or in combination.

The salt of the compound represented by the general formula (b) with an onium compound can be obtained by reacting the compound represented by the general formula (b) with an alkaline substance such as sodium hydroxide in water or an organic solvent or with metallic sodium in an organic solvent, and then further with an onium compound such as benzyltriphenylphosphonium chloride, followed by distilling off the water or the organic solvent. If necessary, the solution of the reaction product may be filtered or the reaction product may be washed with water, an organic solvent or the like in the middle of the procedure to remove by-products such as sodium chloride.

The cross-linking agent is preferably at least one selected from the group consisting of the compound represented by the general formula (b) and the salt of the compound represented by Formula (b) with an onium compound.

The alkali metal is preferably Na or K. The alkaline earth metal is preferably Ca or Mg.

Examples of the onium salt include an ammonium salt, a phosphonium salt, and a sulfonium salt.

Examples of the onium compound constituting the onium salt include an ammonium compound, a phosphonium compound, and a sulfonium compound. In the present disclosure, the onium compound does not contain a fluorine atom.

The onium compound constituting the onium salt is preferably an ammonium compound or a phosphonium compound, more preferably a phosphonium compound, still more preferably a quaternary phosphonium compound, and among these, particularly preferably benzyltriphenylphosphonium. The ammonium compound is preferably a quaternary ammonium compound, and more preferably 8-benzyl-1,8-diazabicyclo[5,4,0]-7-undecenium or benzyldimethyloctadecylammonium.

The cross-linking agent may be at least one selected from the group consisting of a compound represented by the general formula (b) and compounds represented by the following general formulas (b2) to (b3):

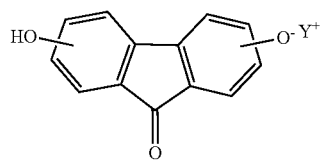
(b2)

wherein $Y^+$ represents a cation of an onium salt; and

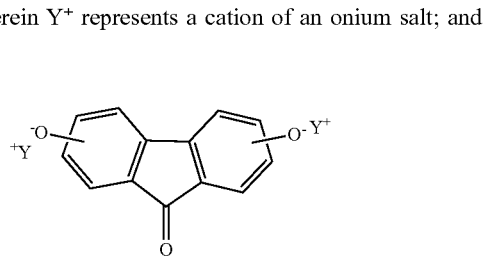
(b3)

wherein $Y^+$ represents a cation of an onium salt.

The compounds represented by the general formulas (b2) and (b3) are onium salts composed of an anion moiety and a cation moiety. $Y^+$ in the general formulas (b2) and (b3) represent cations constituting the onium salts. Examples of the cation represented by $Y^+$ include a benzyltriphenylphosphonium cation, an 8-benzyl-1,8-diazabicyclo[5,4,0]-7-undecenium cation, and a benzyldimethyloctadecylammonium cation.

The compounds represented by the general formulas (b2) to (b3) have two —OH groups or —O⁻ groups in total. The bond position of each group is not particularly limited, and each group can be bonded to any of four carbon atoms to which a substitutable hydrogen atom is bonded among six carbon atoms constituting the 6-membered ring.

The cross-linking agent may be used in combination with other compounds. Examples of the mixture containing a cross-linking agent include a mixture such as a solid solution of a cross-linking agent and a crosslinking accelerator, and a mixture of a cross-linking agent and a compound capable of dissolving the cross-linking agent. The mixture of the cross-linking agent and the crosslinking accelerator is preferably a mixture of the compound represented by the general formula (b) and a quaternary phosphonium salt, and a mixture of the compound represented by the general formula (b) and a quaternary ammonium salt, more preferably a mixture of the compound represented by the general formula (b) and a quaternary phosphonium salt, still more preferably a mixture of 2,7-dihydroxy-9H-fluoren-9-one and a quaternary phosphonium salt, and particularly preferably a mixture of 2,7-dihydroxy-9H-fluoren-9-one and benzyltriphenylphosphonium chloride.

Among them, at least one cross-linking agent selected from the group consisting of 2,7-dihydroxy-9H-fluoren-9-one and salts thereof represented by any of the following formulas can be suitably used.

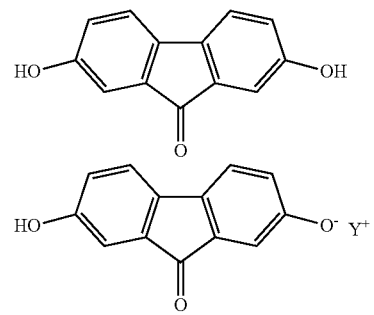

wherein $Y^+$ is a benzyltriphenylphosphonium cation, an 8-benzyl-1,8-diazabicyclo[5,4,0]-7-undecenium cation, or a benzyldimethyloctadecylammonium cation.

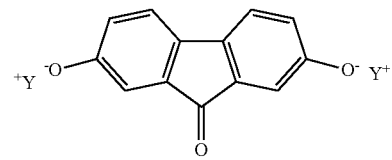

wherein $Y^+$ is a benzyltriphenylphosphonium cation, an 8-benzyl-1,8-diazabicyclo[5,4,0]-7-undecenium cation, or a benzyldimethyloctadecylammonium cation.

The content of the cross-linking agent is preferably 0.1 to 10 parts by mass, more preferably 0.5 to 5 parts by mass, still more preferably 1 to 4 parts by mass, and particularly preferably 1 to 3 parts by mass based on 100 parts by mass of the polyol-crosslinkable fluoroelastomer because a molded article with more excellent compression set characteristics at high temperature can be obtained. When the cross-linking agent is a salt of the compound represented by the general formula (b) with an alkali metal, an alkaline earth metal, or an onium compound, the content (parts by mass) of the cross-linking agent is a value excluding the cation moiety of the cross-linking agent (that is, a cation derived from an alkali metal, an alkaline earth metal, or an onium compound). For example, when the cross-linking agent is a compound represented by the general formula (b2) or general formula (b3), the content (parts by mass) of the cross-linking agent is a value excluding the cation part ($Y^+$) of the onium salt of the general formula (b2) or general formula (b3).

(c) Crosslinking Accelerator

The fluoroelastomer crosslinkable composition of the present disclosure preferably contains a crosslinking accelerator. Use of the crosslinking accelerator enables the crosslinking reaction to be promoted by promoting the formation of intramolecular double bonds in dehydrofluorination reaction of the main chain of the fluoroelastomer. When one compound selected from the compound represented by the general formula (b) and the salt of the compound represented by the general formula (b) with an alkali metal, an alkaline earth metal, or an onium compound is used as the cross-linking agent, a crosslinking accelerator is preferably used together with the cross-linking agent. Even when an onium salt is used as the cross-linking agent, a crosslinking accelerator can be used together with the cross-linking agent, but it is not always necessary to use the crosslinking accelerator. The amount of the crosslinking accelerator can be appropriately adjusted depending on the crosslinking conditions and the physical properties of the molded article. When the amount of the crosslinking accelerator is increased, the crosslinking reaction is accelerated or the crosslinking can be performed at a lower temperature, but the compression set characteristics tend to be deteriorated. On the other hand, when the amount of the crosslinking accelerator is reduced, the crosslinking reaction slows down, but the compression set tends to be improved.

Onium compounds (excluding the salt of the compound represented by the general formula (b) with an onium compound) are generally used as the polyol-crosslinkable crosslinking accelerator. The onium compound is not limited, and examples thereof include ammonium salts such as quaternary ammonium salts, phosphonium salts such as quaternary phosphonium salts, and sulfonium salts; among these, quaternary ammonium salts and quaternary phosphonium salts are preferable.

Examples of the quaternary ammonium salts are not limited, but include 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methylsulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (hereinafter, referred to as DBU-B), 8-benzyl-1,8-diazabicyclo[5.4.0]-7-undecenium hydroxide, 8-phenethyl-1,8-diazabicyclo[5.4.0]-7-undecenium chloride, 8-(3-phenylpropyl)-1,8-diazabicyclo[5.4.0]-7-undecenium chloride, benzyldimethyloctadecylammonium chloride, tetrabutylammonium bromide, tetrabutylammonium chloride, benzyltributylammonium chloride, benzyltriethylammonium chloride, tetrabutylammonium hydrogen sulfate, and tetrabutylammonium hydroxide. Among these, from the viewpoint of crosslinkability, and the physical properties of crosslinked products, DBU-B or benzyldimethyloctadecylammonium chloride is preferable.

Examples of the quaternary phosphonium salts are not limited, but can include tetrabutylphosphonium chloride, benzyltriphenylphosphonium chloride (hereinafter, referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride; among these, from the viewpoint of crosslinkability, and the physical properties of crosslinked products, benzyltriphenylphosphonium chloride (BTPPC) is preferable.

The content of the crosslinking accelerator is preferably 0.1 to 10 parts by mass, more preferably 0.1 to 5 parts by mass, still more preferably 0.1 to 3 parts by mass, and particularly preferably 0.1 to 2 parts by mass based on 100 parts by mass of the polyol-crosslinkable fluoroelastomer, because the crosslinking reaction proceeds at an appropriate rate and a molded article with more excellent compression set characteristics at high temperature can be obtained. When the cross-linking agent is a salt of the compound represented by the general formula (b) with an onium compound, the content of the crosslinking accelerator is a value including the cation moiety of the cross-linking agent (that is, a cation derived from an onium compound). When the cross-linking agent is (b2) or (b3), the content of the crosslinking accelerator is a value including the cation moiety ($Y^+$) of the onium salt of (b2) or (b3).

(d) Acid Acceptor

The fluoroelastomer crosslinkable composition of the present disclosure may further contain an acid acceptor. By containing an acid acceptor, the crosslinking reaction of the fluoroelastomer crosslinkable composition proceeds more smoothly, and the compression set characteristics at high temperature are further improved.

Examples of the acid acceptor include metal oxides such as magnesium oxide, calcium oxide, bismuth oxide, and zinc oxide; metal hydroxides such as calcium hydroxide; alkali metal silicates such as hydrotalcite and sodium metasilicate disclosed in Japanese Translation of PCT International Application Publication No. 2011-522921; and metal salts of weak acids disclosed in Japanese Patent Laid-Open No. 2003-277563. Examples of the metal salt of weak acid include carbonates, benzoates, oxalates, and phosphites of Ca, Sr, Ba, Na, and K.

The acid acceptor is preferably at least one selected from the group consisting of metal oxides, metal hydroxides, alkali metal silicates, and hydrotalcite, because a molded article with more excellent compression set characteristics at high temperature can be obtained. When the obtained molded article is required to have good water resistance, acid resistance, or organic acid ester resistance including biodiesel, the acid acceptor is preferably at least one selected from the group consisting of bismuth oxide and hydrotalcite.

In the fluoroelastomer crosslinkable composition, the content of the acid acceptor is preferably 0.1 to 100 parts by mass, more preferably 1 to 50 parts by mass, still more preferably 1 to 30 parts by mass, and particularly preferably 1 to 20 parts by mass based on 100 parts by mass of the polyol-crosslinkable fluoroelastomer, because a molded article with more excellent compression set characteristics at high temperature can be obtained.

When the content of the acid acceptor is increased, the water resistance, the acid resistance, and the organic acid ester resistance including biodiesel of the obtained molded article tend to decrease, and on the other hand, when the content of the acid acceptor is decreased, the crosslinking rate decreases, and the mechanical properties tend to decrease due to a decrease in crosslinking density. Therefore, the content of the acid acceptor can be selected according to the application of the molded article to be obtained. In the case where an acid acceptor other than calcium hydroxide is contained, the content of calcium hydroxide is reduced to, for example, 0 to 1.5 parts by mass, and then the content of the other acid acceptor is adjusted to adjust the crosslink density, whereby a molded article having further favorable compression set characteristics at high temperature can be obtained.

(e) Other Components

The fluoroelastomer crosslinkable composition may contain a variety of additives, such as usual additives to be compounded in the fluoroelastomer crosslinkable composition as required, such as fillers (carbon black, bituminous coal, barium sulfate, diatomaceous earth, calcined clay, talc and the like), processing aids (wax and the like), plasticizers, colorants, stabilizers, tackifiers (cumarone resins, cumarone indene resins and the like), mold release agents, electroconductivity imparting agents, thermal conductivity imparting agents, surface non-adhesive agents, softness imparting agents, heat resistance improvers, flame retarders, foaming agents, and antioxidants as described in International Publication No. WO 2012/023485, and may contain one or more common cross-linking agents, crosslinking accelerators different from those described above.

The content of the filler such as carbon black is not limited, and is preferably 0 to 300 parts by mass, more preferably 1 to 150 parts by mass, still more preferably 2 to 100 parts by mass, and particularly preferably 2 to 75 parts by mass based on 100 parts by mass of the polyol-crosslinkable fluoroelastomer.

The content of the processing aid such as wax is preferably 0 to 10 parts by mass and still more preferably 0 to 5 parts by mass based on 100 parts by mass of the polyol-crosslinkable fluoroelastomer. When a processing aid, a plasticizer, and a mold release agent are used, the mechanical properties and the sealability of the resulting molded article tend to be impaired, and thus the contents thereof need to be adjusted such that the characteristics of the intended molded article to be obtained are acceptable.

The fluoroelastomer crosslinkable composition may contain a dialkyl sulfone compound. By containing the dialkyl sulfone compound, the crosslinking efficiency of the fluoroelastomer crosslinkable composition is enhanced, the crosslinking rate is increased, and the compression set characteristics are further improved. Examples of the dialkyl sulfone compound include dimethyl sulfone, diethyl sulfone, dibutyl sulfone, methyl ethyl sulfone, diphenyl sulfone, and sulfolane. Among them, sulfolane is preferred from the viewpoint of crosslinking efficiency and compression set properties, as well as appropriate boiling point. The content of the dialkyl sulfone compound is preferably 0 to 10 parts by mass, still more preferably 0 to 5 parts by mass, and particularly preferably 0 to 3 parts by mass based on 100 parts by mass of the polyol-crosslinkable fluoroelastomer. In a case where the fluoroelastomer crosslinkable composition of the present disclosure contains a dialkylsulfone compound, the lower limit of the content of the dialkylsulfone compound may be, for example, 0.1 parts by mass or more based on 100 parts by mass of the polyol-crosslinkable fluoroelastomer.

The fluoroelastomer crosslinkable composition is obtained by kneading the fluoroelastomer (a), the cross-linking agent (b), the crosslinking accelerator (c), the acid acceptor (d), the other components (e) and the like by using a rubber kneading machine generally used. As the rubber kneading machine, there can be used a roll, a kneader, a Banbury mixer, an internal mixer, a twin-screw extruder or the like.

In order to homogeneously disperse each component in the elastomer, there may be used a method in which the fluoroelastomer (a), the cross-linking agent (b) and the crosslinking accelerator (c) are melted and kneaded at a high temperature of 100 to 200° C. in a closed-type kneading machine such as a kneader, and thereafter kneading the acid acceptor (d), the other components (e) and the like at a relatively low temperature equal to or lower than the temperature.

The dispersibility can further be enhanced by kneading the fluoroelastomer (a), the cross-linking agent (b), the crosslinking accelerator (c), the acid acceptor (d) the other components (e) and the like, and after the resultant is left at room temperature for 12 hours or longer, further by again kneading the resultant.

<Molded Article>

A molded article of the present disclosure can be obtained by crosslinking the fluoroelastomer crosslinkable composition. The molded article of the present disclosure can also be obtained by molding and crosslinking the fluoroelastomer crosslinkable composition. The fluoroelastomer crosslinkable composition can be molded by a conventionally known method. The molding and crosslinking methods and conditions are within the scope of known methods and conditions of the adopted molding and crosslinking. The order of molding and crosslinking is not limited, and the composition may be molded and then crosslinked, may be crosslinked and then molded, or simultaneously molded and crosslinked.

Examples of the molding method include, but are not limited to, compression molding, casting, injection molding, extrusion, and molding involving a rotocure. The crosslinking method adopted may be a steam crosslinking method, a crosslinking method by heating, a radiation crosslinking method, or the like; among these, the steam crosslinking method and the crosslinking method by heating are preferable. The unlimited specific crosslinking condition may suitably be determined according to the kinds of the cross-linking agent (b), the crosslinking accelerator (c), the acid acceptor (d) and the like to be used usually in the temperature range of 140 to 250° C. and within the crosslinking time of 1 minute to 24 hours.

By heating the resulting molded article with an oven or the like, mechanical properties such as tensile strength, heat resistance, and compression set characteristics at high temperature can be improved. The unlimited specific crosslinking condition may suitably be determined according to the kinds of the cross-linking agent (b), the crosslinking accelerator (c), the acid acceptor (d) and the like to be used usually in the temperature range of 140 to 300° C. and in the range of 30 minutes to 72 hours.

The molded article of the present disclosure is excellent in various properties such as heat resistance, grease resistance, chemical resistance, and flexibility, and is also excellent in compression set characteristics at high temperature. Therefore, the molded article of the present disclosure is generally used for sites for sliding in contact with other materials, enclosing or sealing other materials and substances, and vibration proofing and sound proofing, and can be used as various parts in various fields such as the automobile industry, the aircraft industry, and the semiconductor industry.

Examples of the fields where the molded article is used include a semiconductor-related field, an automobile field, an aircraft field, a space/rocket field, a ship field, a chemical product field such as chemical plants, a pharmaceutical field such as drugs, a photography field such as developing machines, a printing field such as printing machines, a painting field such as painting equipment, an analytical/physicochemical machinery field such as analytical instruments and measurement instruments, a food equipment field including food plant equipment and household products, a beverage and food manufacturing apparatus field, a drug manufacturing apparatus field, a medical component field, a chemical-reagent transport equipment field, a nuclear power plant equipment field, a steel field such as steel plate processing equipment, a general industrial field, an electrical field, a fuel cell field, an electronic component field, an optical equipment component field, a space equipment component field, a petrochemical plant equipment field, an energy resource searching and mining equipment component field for oil, gas, and the like, a petroleum refining field, and a petroleum transport equipment component field.

Examples of the usage of the molded article include various sealing materials and packings, such as rings, packings, gaskets, diaphragms, oil seals, bearing seals, lip seals, plunger seals, door seals, lip and face seals, gas delivery plate seals, wafer support seals, and barrel seals. The molded article as a sealing material can be used in applications where excellent heat resistance, solvent resistance, chemical resistance, and non-stickiness are required.

Also, the molded article can be used as a tube, a hose, a roll, various types of rubber roll, a flexible joint, a rubber plate, a coating, a belt, a damper, a valve, a valve seat, a valve body, a chemical resistant coating material, a laminating material, a lining material, and the like.

The cross-sectional shape of the ring, packing, and seal may be any of various shapes, and, specifically, it may be, for example, a square shape, an O-shape, or a ferrule, or may be an irregular shape such as a D-shape, an L-shape, a T-shape, a V-shape, an X-shape, or a Y-shape.

In the semiconductor-related field, the molded article can be used in, for example, a semiconductor manufacturing apparatus, a liquid crystal panel manufacturing apparatus, a plasma panel manufacturing apparatus, a plasma display panel manufacturing apparatus, a plasma-addressed liquid crystal panel manufacturing apparatus, an organic EL panel manufacturing apparatus, a field emission display panel manufacturing apparatus, a solar cell substrate manufacturing apparatus, and a semiconductor transport apparatus. Examples of such apparatuses include a CVD apparatus, a gas control apparatus such as a semiconductor gas control apparatus, a dry etching apparatus, a wet etching apparatus, a plasma etching apparatus, a reactive ion etching apparatus, a reactive ion beam etching apparatus, a sputter etching apparatus, an ion beam etching apparatus, an oxidation diffusion apparatus, a sputtering apparatus, an ashing apparatus, a plasma ashing apparatus, a cleaning apparatus, an ion injection apparatus, a plasma CVD apparatus, a ventilation apparatus, an exposure apparatus, a polishing apparatus, a film forming apparatus, a dry etching cleaning apparatus, a UV/$O_3$ cleaning apparatus, an ion beam cleaning apparatus, a laser beam cleaning apparatus, a plasma cleaning apparatus, a gas etching cleaning apparatus, an extraction cleaning apparatus, a Soxhlet extraction cleaning apparatus, a high temperature high pressure extraction cleaning apparatus, a microwave extraction cleaning apparatus, a supercritical extraction cleaning apparatus, a cleaning apparatus involving hydrofluoric acid, hydrochloric acid, sulfuric acid, ozone water, or the like, a stepper, a coater/developer, a CMP apparatus, an excimer laser exposure machine, chemical solution piping, gas piping, an apparatus for carrying out plasma treatment such as $NF_3$ plasma treatment, $O_2$ plasma treatment, and fluorine plasma treatment, a heat treatment film forming apparatus, a wafer transport apparatus, a wafer cleaning apparatus, a silicon wafer cleaning apparatus, a silicon wafer treatment apparatus, an apparatus used in LP-CVD process, an apparatus used in lamp annealing process, and an apparatus used in reflow process.

Specific examples of usage in the semiconductor-related field include various sealing materials such as an O-ring and a gasket for a gate valve, a quartz window, a chamber, a chamber lid, a gate, a bell jar, a coupling, and a pump; various sealing materials such as an O-ring for a resist developer and stripper, a hose, and a tube; a lining and a coating for a resist developer tank, a stripper tank, a wafer cleaning solution tank, and a wet etching tank; a diaphragm for a pump; a roll for wafer transport; a hose and a tube for a wafer cleaning solution; a sealing material for a clean facility, such as a sealant for a clean facility such as a clean room; a sealing material for a storage room for storing semiconductor manufacturing apparatuses and devices such as wafers; and a diaphragm for transferring a chemical solution used in a semiconductor manufacturing process.

In the automobile field, the molded article can be used in an engine body, a main motor system, a valve train system, a lubrication/cooling system, a fuel system, an intake/exhaust system, a transmission system of a drive system, a steering system of a chassis, a brake system, and an electrical component such as a basic electrical component, a control system electrical component, and an equipment electrical component. The automobile field also includes motorcycles.

As for the engine body and its peripherals described above, the molded article can be used for various sealing materials that are required to have heat resistance, oil resistance, fuel oil resistance, engine cooling antifreeze resistance, and steam resistance, and examples of such sealing materials include seals such as gaskets, shaft seals, and valve stem seals, non-contact or contact type packings such as self-seal packings, piston rings, split-ring packings, mechanical seals and oil seals, bellows, diaphragms, hoses, tubes, and various sealing materials used for electric wires, cushioning materials, anti-vibration materials, and belt AT apparatuses.

Specific examples of usage in the fuel system include an O-ring used for a fuel injector, a cold start injector, a fuel line quick connector, a sender flange quick connector, a fuel pump, a fuel tank quick connector, a gasoline mixing pump, a gasoline pump, a tube body of a fuel tube, a connector of a fuel tube, an injector, and the like; a seal used for an intake manifold, a fuel filter, a pressure regulating valve, a canister, a fuel tank cap, a fuel pump, a fuel tank, a fuel tank sender unit, a fuel injection apparatus, a fuel high pressure pump, a fuel line connector system, a pump timing control valve, a suction control valve, a solenoid sub-assembly, a fuel cut valve, and the like; a canister purge solenoid valve seal, an onboard refueling vapor recovery (ORVR) valve seal, a fuel pump oil seal, a fuel sender seal, a fuel tank rollover valve seal, a filler seal, an injector seal, a filler cap seal, and a filler cap valve seal; a hose such as a fuel hose, a fuel supply hose, a fuel return hose, a vapor (evaporation) hose, a vent (breather) hose, a filler hose, a filler neck hose, a hose in a fuel tank (in-tank hose), a carburetor control hose, a fuel inlet hose, and a fuel breather hose; a gasket used for a fuel filter, a fuel line connector system, and the like, and a flange gasket used for a carburetor and the like; a line material for a steam recovery line, a fuel feed line, a vapor/ORVR line, and the like; a diaphragm used for a canister, an ORVR, a fuel pump, a fuel tank pressure sensor, a gasoline pump, a carburetor sensor, a composite air controller (CAC), a pulsation damper, a canister, an autocock, and the like, and a pressure regulator diaphragm of a fuel injector; a fuel pump valve, a carburetor needle valve, a rollover check valve, and a check valve; a tube used in a vent (breather) and a fuel tank; a tank packing for a fuel tank or the like, and a packing for a carburetor acceleration pump piston; a fuel sender anti-vibration component for a fuel tank; an O-ring and a diaphragm for controlling a fuel pressure; an accelerator pump cup; an in-tank fuel pump mount; an injector cushion ring of a fuel injector; an injector seal ring; a needle valve core valve of a carburetor; an acceleration pump piston of a carburetor; a valve seat of a compound air controller (CAC); a fuel tank body; and a seal component for a solenoid valve.

Specific examples of usage in the brake system include a diaphragm used for a master back, a hydraulic brake hose air brake, a brake chamber of an air brake, and the like; a hose used for a brake hose, a brake oil hose, a vacuum brake hose, and the like; various sealing materials such as an oil seal, an O-ring, a packing, and a brake piston seal; a breather valve and a vacuum valve for a master back and a check valve for a brake valve; a piston cup (rubber cup) for a master cylinder, and a brake cup; and a boot for a master cylinder and a vacuum booster of a hydraulic brake, and a wheel cylinder of a hydraulic brake, and an O-ring and a grommet for an anti-lock brake system (ABS).

Specific examples of usage in the basic electrical component include an insulator and a sheath of an electric wire (harness), a tube of a harness exterior component, and a grommet for a connector.

Specific examples of usage in the control system electrical component include a coating material of various sensor wires.

Specific examples of usage in the equipment electrical component include an O-ring and a packing for a car air conditioner, a gasket for a cooler hose, a high pressure air conditioner hose, and an air conditioner hose, a gasket for an electronic throttle unit, a plug boot for direct ignition, and a diaphragm for a distributor. The molded article can also be used to adhere an electrical component.

Specific examples of usage in the intake/exhaust system include a packing used for an intake manifold, an exhaust manifold, and the like, and a throttle body packing for a throttle; a diaphragm used for EGR (exhaust gas recirculation), pressing control (BPT), a wastegate, a turbo wastegate, an actuator, an actuator for a variable turbine geometry (VTG) turbo, an exhaust purification valve, and the like; a hose such as an EGR (exhaust gas recirculation) control hose, an emission control hose, a turbo oil hose (supply) and a turbo oil hose (return) of a turbocharger, a turbo air hose, an intercooler hose, a turbocharger hose, a hose connected to a compressor of a turbo engine equipped with an intercooler, an exhaust gas hose, an air intake hose, a turbo hose, and a DPF (diesel particulate filter) sensor hose; an air duct and a turbo air duct; an intake manifold gasket; and a sealing material EGR, a sealing material used for an afterburn prevention valve seat of an AB valve, a turbine shaft seal (of a turbocharger and the like), and a groove component of a rocker cover and air suction manifold used in automobile engines.

In addition, in exhaust gas control components, the molded article can be used as a seal used for a steam recovery canister, a catalytic converter, an exhaust gas sensor, an oxygen sensor, and the like, and a seal for a solenoid armature of steam recovery and steam canister; and an intake manifold gasket.

In addition, in components relating to diesel engines, the molded article can be used as an O-ring seal for a direct injection injector, a rotary pump seal, a control diaphragm, a fuel hose, a diaphragm for EGR, a priming pump, and a boost compensator, and the like. It can also be used as an O-ring, a sealing material, a hose, a tube, a diaphragm, a gasket material, and a pipe used for a urea SCR system, a urea water tank body of a urea SCR system, a sealing material for a urea water tank, and the like.

Specific examples of usage in the transmission system include a transmission-related bearing seal, oil seal, O-ring, packing, and torque converter hose. Examples also include a transmission oil seal, and a transmission oil hose, an ATF hose, an O-ring, and a packing of an AT.

The transmission includes an AT (automatic transmission), an MT (manual transmission), a CVT (continuously variable transmission), a DCT (dual clutch transmission), and the like.

Examples also include an oil seal, a gasket, an O-ring, and a packing for a manual or automatic transmission, an oil seal, a gasket, an O-ring, and a packing for a continuously variable transmission (a belt type or a toroidal type), a packing for an ATF linear solenoid, an oil hose for a manual transmission, an ATF hose for an automatic transmission, and a CVTF hose for a continuously variable transmission (a belt type or a toroidal type).

Specific examples of usage in the steering system include a power steering oil hose and a high pressure power steering hose.

Examples of usage in the engine body of an automobile engine include gaskets such as a cylinder head gasket, a cylinder head cover gasket, an oil pan packing, and a general-purpose gasket, seals such as an O-ring, a packing, and a timing belt cover gasket, hoses such as a control hose, anti-vibration rubber of an engine mount, a control valve diaphragm, and a camshaft oil seal.

In the main motor system of an automobile engine, the molded article can be used for a shaft seal such as a crankshaft seal and a camshaft seal, and the like.

In the valve train system of an automobile engine, the molded article can be used as a valve stem oil seal of an engine valve, a valve seat of a butterfly valve, and the like.

In the lubrication/cooling system of an automobile engine, the molded article can be used as an engine oil cooler hose, an oil return hose, and a seal gasket of an engine oil cooler, a water hose around a radiator, a radiator seal, a radiator gasket, a radiator O-ring, a vacuum pump oil hose of a vacuum pump, a radiator hose, a radiator tank, a diaphragm for oil pressure, a fan coupling seal, and the like.

Thus, specific examples of usage in the automobile field include an engine head gasket, an oil pan gasket, a manifold packing, an oxygen sensor seal, an oxygen sensor bush, a nitrogen oxide ($NO_x$) sensor seal, a nitrogen oxide ($NO_x$) sensor bush, a sulfur oxide sensor seal, a temperature sensor seal, a temperature sensor bush, a diesel particle filter sensor seal, a diesel particle filter sensor bush, an injector O-ring, an injector packing, a fuel pump O-ring and diaphragm, a gearbox seal, a power piston packing, a cylinder liner seal, a valve stem seal, a static valve stem seal, a dynamic valve stem seal, an automatic transmission front pump seal, a rear axle pinion seal, a universal joint gasket, a speedometer pinion seal, a foot brake piston cup, a torque transmission apparatus O-ring and oil seal, a discharge gas afterburner seal and bearing seal, an afterburner hose, a carburetor sensor diaphragm, an anti-vibration rubber (such as an engine mount, an exhaust part, a muffler hanger, a suspension bush, a center bearing, and a strut bumper rubber), a suspension anti-vibration rubber (such as a strut mount and a bush), a drive system anti-vibration rubber (such as a damper), a fuel hose, an EGR tube and hose, a twin cab tube, a carburetor needle valve core valve, a carburetor flange gasket, an oil hose, an oil cooler hose, an ATF hose, a cylinder head gasket, a water pump seal, a gearbox seal, a needle valve tip, a motorcycle reed valve reed, an automobile engine oil seal, a gasoline hose gun seal, a car air conditioner seal, an engine intercooler rubber hose, a seal of fuel line connector systems, a CAC valve, a needle tip, an electric wire around an engine, a filler hose, a car air conditioner O-ring, an intake gasket, a fuel tank material, a distributor diaphragm, a water hose, a clutch hose, a PS hose, an AT hose, a master back hose, a heater hose, an air conditioner hose, a ventilation hose, an oil filler cap, a PS rack seal, a rack & pinion boot, a CVJ boot, a ball joint dust cover, a strut dust cover, a weather strip, a glass run, a center unit packing, a body sight welt, a bumper rubber, a door latch, a dash insulator, a high tension cord, a flat belt, a poly V belt, a timing belt, a toothed belt, a V-ribbed belt, a tire, a wiper blade, a diaphragm and a plunger for an LPG vehicle regulator, a diaphragm and a valve for a CNG vehicle regulator, a DME compatible rubber component, an auto tensioner diaphragm and boot, an idle speed control diaphragm and valve, an auto speed control actuator, a negative pressure pump diaphragm, a check valve and plunger, an O.P.S. diaphragm and O-ring, a gasoline pressure relief valve, an engine cylinder sleeve O-ring and gasket, a wet cylinder sleeve O-ring and gasket, a differential gear seal and gasket (gear oil seal and gasket), a power steering apparatus seal and gasket (PSF seal and gasket), a shock absorber seal and gasket (SAF seal and gasket), a constant velocity joint seal and gasket, a wheel bearing seal and gasket, a metal gasket coating agent, a caliper seal, a boot, a wheel bearing seal, and a bladder used in vulcanization molding of a tire.

In the aircraft field, the space/rocket field, and the ship field, the molded article can be used especially in a fuel system and a lubricating oil system.

In the aircraft field, the molded article can be used as, for example, various aircraft sealing components, various aircraft components in aircraft engine oil applications, a jet engine valve stem seal, gasket, and O-ring, a rotating shaft seal, a hydraulic equipment gasket, a fire wall seal, a fuel supply hose, gasket, and O-ring, an aircraft cable, oil seal, and shaft seal, and the like.

In the space/rocket field, the molded article can be used as, for example, a lip seal, a diaphragm, and an O-ring for a spacecraft, a jet engine, a missile, and the like, a gas turbine engine oil-resistant O-ring, a vibration isolation table pad for missile ground control, and the like.

In the ship field, the molded article can be used as, for example, a screw propeller shaft stern seal, a diesel engine intake/exhaust valve stem seal, a valve seal of a butterfly valve, a valve seat and a shaft seal of a butterfly valve, a shaft seal of a butterfly valve, a stern tube seal, a fuel hose, a gasket, an engine O-ring, a ship cable, a ship oil seal, a ship shaft seal, and the like.

In the chemical product field such as chemical plants and the pharmaceutical field such as drugs, the molded article can be used in a process where a high level of chemical resistance is required, such as a process of producing chemical products such as drugs, agrochemicals, coating materials, and resins.

Specific examples of usage in the chemical product and pharmaceutical fields include seals used in a chemical apparatus, a pump and a flow meter for chemical reagents, piping for chemical reagents, a heat exchanger, an agrochemical sprayer, an agrochemical transfer pump, gas piping, a fuel cell, an analytical instrument and physicochemical instrument (such as column fitting for analytical instruments and measurement instruments), an expansion joint of a flue gas desulfurization apparatus, a nitric acid plant, a power plant turbine, and the like, a seal used in a medical sterilization process, a seal for a plating solution, a belt roller seal for paper making, a wind tunnel joint seal; an O-ring used in a chemical apparatus such as a reactor and a stirrer, an analytical instrument and measurement instrument, a chemical pump, a pump housing, a valve, a rotary meter, and the like, an O-ring for a mechanical seal, and an O-ring for compressor sealing; a packing used in a tube joint part or the like of a high temperature vacuum dryer, a gas chromatography, and a pH meter, and a glass cooler packing for a sulfuric acid manufacturing apparatus; a diaphragm used in a diaphragm pump, an analytical instrument, a physicochemical instrument, and the like; a gasket used in an analytical instrument and a measurement instrument; a fitting wheel (ferrule) used in an analytical instrument and a measurement instrument; a valve seat; a U cup; a lining used in a chemical apparatus, a gasoline tank, a wind tunnel, and the like, and a corrosion-resistant lining for an anodized aluminum processing tank; a coating of a masking jig for plating; a valve component of an analytical instrument and a physicochemical instrument; an expansion joint of a flue gas desulfurization plant; an acid resistant hose against concentrated sulfuric acid and the like, a chlorine gas transfer hose, an oil-resistant hose, a rainwater drain hose for benzene and toluene storage tanks; a chemical resistant tube and a medical tube used in an analytical instrument and a physicochemical instrument; a trichlorethylene-resistant roll for fiber dyeing and a dyeing roll; a medical plug for drug; a medical rubber plug; a chemical solution bottle, a chemical solution tank, a bag, a chemical container; and protective equipment such as a glove and a boot that are resistant to strong acids and solvents.

In the photography field such as a developing machine, the printing field such as a printing machine, and the painting field such as painting equipment, the molded article can be used as a roll, a belt, a seal, a valve component, and the like of a dry copier.

Specific examples of usage in the photography field, the printing field, and the painting field include a surface layer of a transfer roll of a copier, a cleaning blade of a copier, and a copier belt; a roll (such as a fixing roll, a crimping roll, and a pressure roll) and a belt for OA equipment such as a copier, a printer, and a facsimile; a roll, a roll blade, and a belt of a PPC copier; a roll of a film developer and an X-ray film developer; a printing roll, a scraper, a tube, a valve component, and a belt for a printing machine; an ink tube, a roll, and a belt of a printer; a coating roll, a scraper, a tube, and a valve component of painting and coating equipment; and a development roll, a gravure roll, a guide roll, a guide roll for a magnetic tape manufacturing coating line, a gravure roll for a magnetic tape manufacturing coating line, a coating roll, and the like.

In the food plant equipment and the food equipment field including household products, the molded article can be used in a food manufacturing process and for food transfer equipment or food storage equipment.

Specific examples of usage in the food equipment field include a seal for a plate-type heat exchanger, a solenoid valve seal for an automatic vending machine, a jar pot packing, a sanitary pipe packing, a pressure cooker packing, a water heater seal, a heat exchanger gasket, a diaphragm and a packing for a food processing treatment apparatus, a rubber material for a food processing treatment machine (e.g., various seals such as a heat exchanger gasket, a diaphragm, and an O-ring, piping, a hose, a sanitary packing, a valve packing, and a filling packing used as a joint between the mouth of a bottle or the like and a filler during filling). Examples also include a packing, a gasket, a tube, a diaphragm, a hose, and a joint sleeve used for products such as alcoholic beverages and soft drinks, a filling apparatus, a food sterilizer, a brewing apparatus, a water heater, and various automatic food vending machines.

In the nuclear power plant equipment field, the molded article can be used for a check valve and a pressure reducing valve around a nuclear reactor, a seal for a uranium hexafluoride enricher, and the like.

Specific examples of usage in the general industrial field include a sealing material for hydraulic equipment such as a machine tool, a construction machine, and a hydraulic machine; a seal and a bearing seal of a hydraulic and lubrication machine; a sealing material used for a mandrel and the like; a seal used for a window of a dry cleaner and the like; a seal and a (vacuum) valve seal for a cyclotron, a proton accelerator seal, a seal for an automatic packaging machine, a diaphragm of a pump for an analyzer of sulfur dioxide gas and chlorine gas in air (pollution measuring equipment), a snake pump lining, a roll and a belt for a printer, a transport belt (a conveyor belt), a squeezing roll for acid-washing of an iron plate and the like, a robot cable, a solvent squeezing roll for aluminum rolling line and the like, a coupler O-ring, an acid resistant cushioning material, a dust seal and a lip rubber for a sliding part of a cutting machine, a gasket for garbage incinerator, a friction material, a metal or rubber surface modifier, and a covering material. The molded article can also be used as a gasket and a sealing material for an apparatus used in a papermaking process, a sealant for a clean room filter unit, an architectural sealant, a protective coating agent for concrete, cement, and the like, a glass cloth impregnating material, a polyolefin processing aid, a polyethylene moldability improving additive, a fuel tank for a small generator, a lawnmower, and the like, and a pre-coated metal obtained by applying a primer treatment to a metal plate. In addition, the molded article can be used as a sheet and a belt by impregnating a woven fabric therewith and baking it.

Specific examples of usage in the steel field include an iron plate processing roll for iron plate processing equipment.

Specific examples of usage in the electrical field include an insulating oil cap for the Shinkansen bullet train, a benching seal for a liquid-sealed transformer, a transformer seal, an oil well cable jacket, a seal for an oven such as an electric furnace, a window frame seal for a microwave oven, a sealing material used when bonding a wedge and a neck of CRT, a sealing material for a halogen lamp, a fixing agent for an electrical component, a sealing material for end treatment of a sheathed heater, and a sealing material used as an insulation and moisture proof treatment of a lead wire terminal of electrical equipment. The molded article can also be used as a covering material of an oil resistant/heat resistant electric wire, a highly heat resistant wire, a chemical resistant wire, a highly insulated wire, a high voltage transmission line, a cable, an electric wire used in a geothermal power generation apparatus, an electric wire used around an automobile engine, and the like. The molded article can also be used as an oil seal and a shaft seal of a vehicle cable. Moreover, the molded article can also be used as an electrical insulation material (such as a material used as an insulation spacer of various electric apparatuses, an insulation tape used in a joint, a terminal part, and the like of a cable, and a heat-shrinkable tube), and an electric and electronic apparatus materials used in a high temperature atmosphere (such as a lead wire material for a motor and a wire material around a high temperature furnace). The molded article can also be used in a sealing layer and a protective film (a back sheet) of a solar cell.

In the fuel cell field, the molded article can be used as a sealing material between electrodes or between an electrode and a separator, a seal, a packing, a separator, and the like of a pipe for hydrogen, oxygen, produced water, and the like in solid polymer fuel cells, phosphate fuel cells, and the like.

In the electronic component field, the molded article can be used as a heat dissipation material raw material, an electromagnetic wave shielding material raw material, a gasket for a computer hard disk drive (magnetic recorder), and the like. The molded article can also be used as a cushioning rubber (a crash stopper) for a hard disk drive, a binder for an electrode active material of a nickel-metal hydride secondary battery, a binder for an active material of a lithium-ion battery, a polymer electrolyte for a lithium secondary battery, a binder for the positive electrode of an alkaline rechargeable battery, a binder for an EL element (an electroluminescence element), a binder for the electrode active material of a capacitor, an encapsulating agent, a sealant, a film and a sheet for a covering material for the quartz of an optical fiber, an optical fiber covering material, and the like, a potting, a coating, and an adhesive seal for electronic components and circuit boards such as a CMOS electronic circuit, a transistor, an integrated circuit, an organic transistor, a light emitting element, an actuator, a memory, a sensor, a coil, a capacitor, and a resistor, a fixative for an electronic component, a modifying agent for an encapsulating agent such as epoxy, a coating agent for a printed circuit board, a modifying agent for a printed wiring board prepreg resin such as epoxy, an anti-scattering material for a light bulb and the like, a gasket for a computer, a cooling hose for a large computer, a packing such as a gasket or an O-ring for a secondary battery and especially a lithium secondary battery, a sealing layer for covering one or both outer surfaces of an organic EL structure, a connector, and a damper.

In the chemical reagent transport equipment field, the molded article can be used as a safety valve and a shipping valve for trucks, trailers, tank trucks, ships, and the like.

In the energy resource searching and mining equipment component field for oil, gas, and the like, the molded article can be used as various sealing materials used when mining oil, natural gas, and the like, an electric connector boot used in oil wells, and the like.

Specific examples of usage in the energy resource search and mining equipment component field include a drill bit seal, a pressure regulating diaphragm, a horizontal drilling motor (stator) seal, a stator bearing (shaft) seal, a sealing material used in a blowout prevention apparatus (BOP), a sealing material used in a rotary blowout prevention apparatus (pipe wiper), a sealing material and a gas-liquid connector used in MWD (real-time drilling information detection system), a logging tool seal used in a logging apparatus (such as an O-ring, a seal, a packing, a gas-liquid connector, and a boot), an inflatable packer and a completion packer and a packer seal used therein, a seal and a packing used in a cementing apparatus, a seal used in a perforator, a seal and a packing and a motor lining used in a mud pump, an underground auditory detector cover, a U-cup, a composition seating cup, a rotating seal, a laminated elastomeric bearing, a flow control seal, a sand volume control seal, a safety valve seal, a seal of a hydraulic fracturing apparatus, a seal and a packing for a linear packer and a linear hanger, a wellhead seal and packing, a seal and a packing for a chalk and a valve, a sealing material for LWD (logging while excavation), a diaphragm used in oil exploration and oil drilling applications (such as a diaphragm for supplying lubricating oil to oil drilling bits), and a seal element for gate valves, electronic boots, and perforation guns.

In addition, the molded article can be used in a joint seal for a kitchen, a bathroom, a washroom, and the like; a ground sheet of an outdoor tent; a seal for a stamp material; a rubber hose for a gas heat pump and a Freon-resistant rubber hose; an agricultural film, lining, and weather resistance cover; a tank of a laminated steel sheet or the like used in the fields of construction and household electric appliances, and the like.

Moreover, the molded article can also be used as an article combined with a metal such as aluminum. Examples of such usage include a door seal, a gate valve, a pendulum valve, a solenoid tip, and also a piston seal and a diaphragm combined with a metal, a metal rubber component combined with a metal, such as a metal gasket.

The molded article can also be used as a rubber component, a brake shoe, a brake pad, and the like of bicycles.

Further, the molded article can be applied to belts.

Examples of the belt are as follows: a power transmission belt (including a flat belt, a V-belt, a V-ribbed belt, a toothed belt, and the like), a flat belt used as a transport belt (a conveyor belt) at various high-temperature sites, e.g., around an engine of agricultural machinery, a machine tool, industrial machinery, and the like; a conveyor belt for transporting bulk and particulate materials such as coal, crushed stone, earth and sand, ore, wood chips, and the like in a high temperature environment; a conveyor belt used in a steel mill such as a blast furnace; a conveyor belt in applications exposed to a high temperature environment in precision equipment assembly plants, food factories, and the like; a V-belt and a V-ribbed belt for agricultural machinery, general equipment (such as OA equipment, printing machines, and commercial dryers), automobiles, and the like; a transmission belt for a transfer robot; a toothed belt such as a transmission belt for food machines and machine tools; and a toothed belt used in an automobile, OA equipment, medical equipment, a printing machine, and the like.

In particular, a timing belt is a representative example of a toothed belt for automobiles.

The belt may have a single-layer structure or a multi-layer structure.

In the case of a multi-layer structure, the belt may be composed of a layer obtained by crosslinking a fluoroelastomer crosslinkable composition and a layer made of another material.

In a belt having a multi-layer structure, examples of the layer made of another material include a layer made of another rubber, a layer made of a thermoplastic resin, various fiber-reinforced layers, canvas, and a metal foil layer.

The molded article can also be used as an industrial anti-vibration pad, an anti-vibration mat, a railway slab mat, a pad, an automobile anti-vibration rubber, and the like. Examples of the automobile anti-vibration rubber include anti-vibration rubbers for an engine mount, a motor mount, a member mount, a strut mount, a bush, a damper, a muffler hanger, a center bearing, and the like.

Examples of another usage include a joint member for a flexible joint, an expansion joint, and the like, a boot, and a grommet. In the ship field, examples include marine pumps.

The joint member refers to a joint used in piping and piping equipment, and used in applications for preventing vibration and noise produced from the piping system, absorbing expansion, contraction and displacement resulting from a temperature change and a pressure change, absorbing a dimensional change, mitigating and preventing the influences of earthquakes and land subsidence, and the like.

The flexible joint and the expansion joint can be preferably used as complex-shape molded bodies for, for example, shipbuilding piping, for mechanical piping of a pump, a compressor, and the like, for chemical plant piping, for electrical piping, for civil engineering and water piping, and for automobiles.

The boot can be preferably used as a complex-shape molded body for various industrial boots, e.g., a boot for an automobile such as a constant velocity joint boot, a dust cover, a rack and pinion steering boot, a pin boot, and a piston boot, a boot for agricultural machinery, a boot for an industrial vehicle, a boot for construction machinery, a boot for hydraulic machinery, a boot for pneumatic machinery, a boot for a centralized lubricator, a boot for liquid transfer, a boot for fire extinguishing, and a boot for transferring various types of liquefied gas.

The molded article can also be used for a diaphragm for a filter press, a diaphragm for a blower, a diaphragm for supplying water, a diaphragm for a liquid storage tank, a diaphragm for a pressure switch, a diaphragm for an accumulator, a diaphragm for an air spring such as a suspension, and the like.

By adding the molded article to rubber or resin, an antislipping agent for obtaining a molded article or a coating film that is unlikely to be slippery in a wetting environment of rain, snow, ice, sweat, or the like can be obtained.

The molded article can also be used as, for example, a cushioning material for hot press molding when producing decorative plywood, a printed circuit board, an electrical insulation board, and a rigid polyvinyl chloride laminate made of melamine resin, phenol resin, epoxy resin, or the like.

In addition, the molded article can also contribute to impermeability of various supports such as weapon-related sealing gaskets and protective clothes against contact with invasive chemicals.

The molded article can also be used as an O (square)-ring, a V-ring, an X-ring, a packing, a gasket, a diaphragm, an oil seal, a bearing seal, a lip seal, a plunger seal, a door seal, a lip and face seal, a gas delivery plate seal, a wafer support seal, a barrel seal, and other various sealing materials used for sealing lubricating oil (such as engine oil, transmission oil, and gear oil) containing amine-type additives (in particular, amine-type additives used as antioxidants and detergent dispersants) used in transportation systems such as automobiles and ships, and fuel oil and grease (in particular, urea-based grease), and can also be used as a tube, a hose, various rubber rolls, a coating, a belt, a valve body of a valve, and the like. The molded article can also be used as a laminating material and a lining material.

The molded article can also be used for a coating material for a heat-resistant, oil-resistant electric wire used as a lead wire of a sensor that comes into contact with transmission oil and/or engine oil of an internal combustion engine of an automobile and the like and that detects the oil temperature and/or the oil pressure, and in a high-temperature oil atmosphere inside an oil pan or the like of an automatic transmission or an engine.

In addition, the molded article may be used after forming a vulcanized film thereon. Specific examples include applications such as a non-stick oil resistant roll for a copier, a weather strip for preventing weathering and freezing, an infusion rubber stopper, a vial rubber stopper, a mold release agent, a non-stick light-weight transport belt, an adhesion preventing coating on a play gasket of an automobile engine mount, a synthetic fiber coating processing, a bolt member or a joint having thin packing-coated layer, and the like.

The automobile-related component applications of the molded article also include an application as components of motorcycles having the same structure.

Examples of automobile-related fuel include light oil, gasoline, and fuel for diesel engines (including biodiesel fuel).

The molded article can also be used as a sealing material for a rolling bearing.

Examples of the rolling bearing include a ball bearing, a roller bearing, a bearing unit, and a linear bearing.

Examples of the ball bearing include a radial ball bearing, a thrust ball bearing, and a thrust angular contact ball bearing.

Examples of the radial ball bearing include a deep groove ball bearing, an angular contact ball bearing, a four-point contact ball bearing, and a self-aligning ball bearing.

The deep groove ball bearing is used in, for example, electric motors, household electric appliances, and OA equipment.

Examples of the angular contact ball bearing include a single-row angular contact ball bearing, a matched mounting angular contact ball bearing, and a double-row angular contact ball bearing, and the single-row angular contact ball bearing is used in electric motors, household electric appliances and OA equipment, and in hydraulic pumps, vertical pumps, and the like that are subjected to an axial load in addition to a radial load. The matched mounting angular contact ball bearing is used for the main shaft, the grinding spindle, and the like of a machine tool required to have an increased rotational accuracy and rigidity of the shaft. The double-row angular contact ball bearing is used in an electromagnetic clutch for an automobile air conditioner, and the like.

The four-point contact ball bearing is used in, for example, a speed reducer that receives an axial load from both directions and in which a large space for the bearing width is not available.

The self-aligning ball bearing is used in a place where it is difficult to align the shaft and the housing, a power transmission shaft that readily deflects, and the like.

The thrust ball bearing includes a single direction thrust ball bearing and a double direction thrust ball bearing, and the molded article is applicable to conventionally known applications in which such ball bearings are used.

The thrust angular contact ball bearing is used in combination with a double-row cylindrical roller bearing to receive the axial load of the main shaft of a machine tool.

Examples of the roller bearing include a radial roller bearing and a thrust roller bearing.

Examples of the radial roller bearing include a cylindrical roller bearing, a needle roller bearing, a tapered roller bearing, and a self-aligning roller bearing.

The cylindrical roller bearing is used in general machinery, a machine tool, an electric motor, a speed reducer, a train wheel axle, an aircraft, and the like.

The needle roller bearing is used in general machinery, an automobile, and an electric motor.

The tapered roller bearing is used in a machine tool, a wheel axle for an automobile and a train, a rolling mill, a speed reducer, and the like.

The self-aligning roller bearing is used in general machinery, a rolling mill, a paper making machine, a wheel axle, and the like.

Examples of the thrust roller bearing include a thrust cylindrical roller bearing, a thrust needle roller bearing, a thrust tapered roller bearing, and a thrust self-aligning roller bearing.

The thrust cylindrical roller bearing is used in a machine tool, general machinery, and the like.

The thrust needle roller bearing is used in an automobile, a pump, general machinery, and the like.

The thrust tapered roller bearing is used in general machinery, a rolling mill, and the like.

The thrust self-aligning roller bearing is used in a crane, an extruder, general machinery, and the like.

In addition to being crosslinked and used as a molded article, the fluoroelastomer crosslinkable composition can be used as various components in various industrial fields. Accordingly, applications of the fluoroelastomer crosslinkable composition will now be described next.

The fluoroelastomer crosslinkable composition can be used for, for example, surface modifiers for metal, rubber, plastic, glass, and the like; sealing materials and covering materials required to have heat resistance, chemical resistance, oil resistance, and non-stickiness, such as metal gaskets and oil seals; non-stick covering materials such as rolls for OA equipment and belts for OA equipment belts, or bleed barriers; and coating woven fabric sheets and belts by impregnation and baking.

The fluoroelastomer crosslinkable composition, by being configured to have highly viscosity and high concentration, can be used as a sealing material, a lining, and a sealant having a complex shape by an ordinary method; by being configured to have low viscosity, can be used to form a thin film of several micrometers; and, by being configured to have medium viscosity, can be used to coat a pre-coated metal, an O-ring, a diaphragm, and a reed valve.

Moreover, the fluoroelastomer crosslinkable composition can be used to coat a conveyor roll or belt for a woven fabric or a paper sheet, a printing belt, a chemical resistant tube, a chemical stopper, a fuel hose, and the like.

Examples of usable article substrates to be covered with the fluoroelastomer crosslinkable composition include metals such as iron, stainless steel, copper, aluminum, and brass; glass products such as glass plates, and woven fabrics and non-woven fabrics of glass fiber; molded articles of, and items covered with, general-purpose and heat-resistant resins such as polypropylene, polyoxymethylene, polyimide, polyamideimide, polysulfone, polyethersulfone, and polyether ether ketone; molded articles of, and items covered with, general-purpose rubber such as SBR, butyl rubber, NBR, and EPDM, and heat-resistant rubber such as silicone rubber and fluoroelastomer; and woven fabrics and non-woven fabrics of natural fiber and synthetic fiber.

Covered items formed from the fluoroelastomer crosslinkable composition can be used in fields where heat resistance, solvent resistance, lubricity, and non-stickiness are required, and specific examples of applications include rolls (such as fixing rolls, and crimping rolls) and conveyor belts for OA equipment such as copiers, printers, and facsimiles; sheets and belts; and O-rings, diaphragms, chemical resistant tubes, fuel hoses, valve seals, gaskets for chemical plants, and engine gaskets.

The fluoroelastomer crosslinkable composition can also be used as a coating material or an adhesive by being dissolved in a solvent. The fluoroelastomer crosslinkable composition can also be used as an emulsified dispersion (latex) or as a coating material.

The fluoroelastomer crosslinkable composition is used as, for example, a sealing material and a lining for various apparatuses, pipes, and the like, and a surface-treating agent for structures made of inorganic and organic substrates such as metal, ceramic, glass, stone, concrete, plastic, rubber, wood, paper, and fiber.

The fluoroelastomer crosslinkable composition can be applied to a substrate and the like by dispenser coating or screen printing coating.

The fluoroelastomer crosslinkable composition may be used as a coating composition to cast film or to impregnate a substrate such as fabric, plastic, metal, or an elastomer.

In particular, the fluoroelastomer crosslinkable composition can be used in the form of a latex for producing covered fabric, protective gloves, impregnated fibers, O-ring coverings, covers for fuel system quick connecting O-rings, covers for fuel system seals, covers for fuel tank rollover valve diaphragms, covers for fuel tank pressure sensor diaphragms, covers for oil filter and fuel filter seals, covers for fuel tank sender seals and sender head fitting seals, covers for copier fixing mechanism rolls, and polymer coating material compositions.

The fluoroelastomer crosslinkable composition is useful for covering silicone rubber, nitrile rubber, and other elastomers. To increase the thermal stability thereof as well as both the permeation resistance and the chemical resistance of substrate elastomers, the fluoroelastomer crosslinkable composition is also useful for covering components made from such elastomers. Other applications include coverings for heat exchangers, expansion joints, vats, tanks, fans, flue ducts and other conduits, and storage structures such as concrete storage structures. The fluoroelastomer crosslinkable composition may be applied to the exposed cross-section of a multi-layer component structure in, for example, a method for producing a hose structure and a diaphragm. A sealing member at a connecting part and a joint is often made of a rigid material, and the fluoroelastomer crosslinkable composition provides an improved frictional interface and an enhanced dimensional interference fit, with reduced trace leakage, along a sealed surface. The latex thereof increases seal durability in a variety of automobile system applications.

The fluoroelastomer crosslinkable composition can be used in the production of a power steering system, a fuel system, an air conditioning system, and any joint where a hose and a tube are connected to another component. The fluoroelastomer crosslinkable composition is further useful in the repair of manufacturing defects (and damage resulting from use) in a multi-layer rubber structure such as a three-layer fuel hose. The fluoroelastomer crosslinkable composition is also useful for coating a thin steel sheet that may be formed or embossed before or after a coating material is applied. For example, multiple layers of covered steel can be assembled to form a gasket between two rigid metal members. A sealing effect is obtained by applying the fluoroelastomer crosslinkable composition between the layers. This process can be used to produce an engine head gasket and an exhaust manifold gasket to provide reduced bolt force and strain of assembled components while providing good fuel saving and reduced leakage due to reduced cracks, deflections, and hole strains.

In addition, the fluoroelastomer crosslinkable composition can also be used as a coating agent; a substrate-integrated gasket and packing formed by dispenser-molding the composition onto a substrate containing an inorganic material such as metal or ceramic; a multi-layer article obtained by being coated onto a substrate containing an inorganic material such as metal or ceramic; and the like.

The fluoroelastomer crosslinkable composition is also suitable as a wiring material for electronic devices that are light and bendable, and can be used in known electronic components. Examples include electronic components such as CMOS electronic circuits, transistors, integrated circuits, organic transistors, light emitting elements, actuators, memories, sensors, coils, capacitors, and resistors. Due to the use thereof, flexible electronic devices can be obtained, such as solar cells, various displays, sensors, actuators, electronic artificial skin, sheet-shaped scanners, braille displays, and wireless power transmission sheets.

While embodiments have been described above, it will be understood that various changes in form and details can be made without departing from the gist and scope of the claims.

According to the present disclosure, there is provided a fluoroelastomer crosslinkable composition, comprising a polyol-crosslinkable fluoroelastomer (a); and a cross-linking agent (b), wherein the cross-linking agent (b) is at least one selected from the group consisting of a compound represented by the general formula (b) and a salt of the compound with an alkali metal, an alkaline earth metal, or an onium compound,

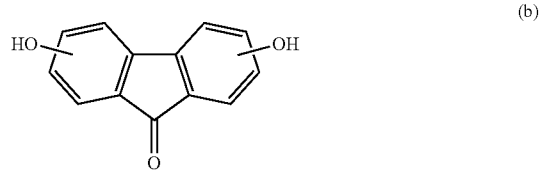

(b)

wherein a hydrogen atom bonded to two benzene rings is optionally replaced with any substituent not containing a halogen atom.

In the fluoroelastomer crosslinkable composition of the present disclosure, the fluoroelastomer (a) preferably contains a vinylidene fluoride unit.

In the fluoroelastomer crosslinkable composition of the present disclosure, the content of the cross-linking agent (b) is preferably 0.1 to 10 parts by mass based on 100 parts by mass of the fluoroelastomer (a).

The fluoroelastomer crosslinkable composition of the present disclosure preferably further contains a crosslinking accelerator (c).

In the fluoroelastomer crosslinkable composition of the present disclosure, the content of the crosslinking accelerator (c) is preferably 0.1 to 10 parts by mass based on 100 parts by mass of the fluoroelastomer (a).

The fluoroelastomer crosslinkable composition of the present disclosure preferably further contains an acid acceptor (d).

In the fluoroelastomer crosslinkable composition of the present disclosure, the content of the acid acceptor (d) is preferably 0.1 to 50 parts by mass based on 100 parts by mass of the fluoroelastomer (a).

In the fluoroelastomer crosslinkable composition of the present disclosure, the acid acceptor (d) is preferably at least one selected from the group consisting of metal oxides, metal hydroxides, alkali metal silicates, weak acid metal salts and hydrotalcite.

In the fluoroelastomer crosslinkable composition of the present disclosure, the cross-linking agent (b) is preferably at least one selected from the group consisting of 2,7-dihydroxy-9H-fluoren-9-one and a salt of 2,7-dihydroxy- 9H-fluoren-9-one with an alkali metal, an alkaline earth metal, or an onium compound.

The fluoroelastomer crosslinkable composition of the present disclosure preferably further contains a dialkyl sulfone compound.

According to the present disclosure, there is also provided a molded article obtained from the fluoroelastomer crosslinkable composition.

EXAMPLES

Next, embodiments of the present disclosure will now be described by way of Examples, but the present disclosure is not limited only to the Examples.

Various numerical values in the Examples were measured by the following methods.

<Compositional Features of Copolymer>

Measurements were performed using 19F-NMR (manufactured by Bruker, AC300P).

<Fluorine Content>

The fluorine content was determined by calculation from the compositional feature of the fluoroelastomer measured by 19F-NMR.

Mooney Viscosity (ML 1+10 (100° C.)>

The Mooney viscosity was measured according to ASTM D1646-15 and JIS K6300-1:2013. The measurement temperature was 100° C.

<Glass Transition Temperature (Tg)>

Using a differential scanning calorimeter (manufactured by Mettler Toledo, DSC822e, or manufactured by Hitachi High-Tech Corporation, X-DSC7000), 10 mg of a sample was heated at 20° C./min to obtain a DSC curve, and a temperature indicating an intersection point of an extension of a baseline around the second-order transition of the DSC curve with a tangent of the DSC curve at the inflection point was taken as the glass transition temperature.

<Heat of Fusion>

Using a differential scanning calorimeter (manufactured by Mettler Toledo, DSC822e, or manufactured by Hitachi High-Tech Corporation, X-DSC7000), 10 mg of a sample was heated at 20° C./min to obtain a DSC curve, and from a magnitude of a melting peak ($\Delta H$) appearing in the DSC curve, a heat of fusion was calculated.

<Crosslinking Characteristics (Maximum Torque (MH), Optimum Crosslinking Time (T90))>

For a fluoroelastomer crosslinkable composition, in primary crosslinking, a crosslinking curve at 180° C. was determined by using a vulcanization tester (manufactured by M&K Co., Ltd. MDR H2030), and the maximum torque (MH) and optimum crosslinking time (T90) were determined from the change in the torque.

<M100, Tensile Strength and Elongation at Break>

Using a crosslinked sheet of 2 mm in thickness, the 100% modulus (M100), tensile strength and elongation at break at 23° C. were measured with a tensile tester (manufactured by A&D Co., Ltd., Tensilon RTG-1310) under the conditions of 500 mm/min and dumbbell No. 6 according to JIS K6251:2010.

<Hardness>

Three sheets of cross-linked sheets of 2 mm in thickness were stacked, and the durometer hardness thereof (type A, value after 3 seconds) was measured according to JIS K6251-3:2012.

<Compression Set>

The compression set was measured using a small test piece for measurement of compression set according to method A of JIS K6262:2013 with a compression ratio of 25%, a test temperature of 200° C., and a test time of 72 hours.

The following materials were used in Examples and Comparative Examples.

Fluoroelastomer A: Vinylidene Fluoride/Hexafluoropropylene Copolymer

Molar ratio of vinylidene fluoride/hexafluoropropylene: 78/22 (mol %)

Fluorine content: 66% by mass

Mooney viscosity (ML1+10 (100° C.)): 69

Glass transition temperature: −18° C.

Heat of fusion: not observed in second run

Fluoroelastomer B: Vinylidene Fluoride/Hexafluoropropylene/Tetrafluoroethylene Copolymer Molar ratio of vinylidene Fluoride/Hexafluoropropylene/Tetrafluoroethylene: 58/22/20 (Mol %)

Fluorine content: 69% by mass

Mooney viscosity (ML1+10 (100° C.)): 42

Glass transition temperature: −13° C.

Heat of fusion: not observed in second run

MT carbon ($N_2SA$: 8 $m^2$/g, DBP: 43 ml/100 g)

Calcium hydroxide

Magnesium oxide

Sulfolane

Crosslinking accelerator A: mixture of 91% by mass of benzyldimethyloctadecylammonium chloride and 9% by mass of isopropyl alcohol Crosslinking accelerator B: benzyltriphenylphosphonium chloride (BTPPC)

Crosslinking accelerator C: 8-benzyl-1,8-diazabicyclo[5,4,0]-7-undecenium chloride (DBU-B)

Cross-linking agent-1a: 2,7-dihydroxy-9H-fluoren-9-one

Cross-linking agent-2: 2,4'-dihydroxybenzophenone

Cross-linking agent-3: 4,4'-dihydroxybenzophenone

Cross-linking agent-4: 2,4'-dihydroxydiphenyl sulfone

Cross-linking agent-5: bis(4-hydroxyphenyl)sulfone

Cross-linking agent-6: 2,6-dihydroxyanthracene

Cross-linking agent-7: hydroquinone

Cross-linking agent-8: 4,4'-dihydroxydiphenyl ether

Examples 1 to 4 and Comparative Examples 1 to 11

Respective components were compounded according to the formulation in Tables 1 to 4, and kneaded on an open roll to thereby prepare fluoroelastomer crosslinkable compositions. The maximum torque (MH) and optimum crosslinking time (T90) of the obtained fluoroelastomer crosslinkable compositions are shown in Tables 1 to 4. Next, the obtained fluoroelastomer crosslinkable compositions were crosslinked by primary crosslinking (press crosslinking) at 180° C. for 20 minutes and secondary crosslinking (oven crosslinking) at 230° C. for 24 hours to obtain crosslinked sheet (thickness: 2 mm) and a small test piece for measurement of compression set. The evaluation results and the compression set test results of the obtained crosslinked sheet are shown in Tables 1 to 4.

TABLE 1

| | | | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Compounding | Fluoroelastomer A | parts by mass | 100 | 100 | 100 | 100 | 100 | 100 | 100 | 100 |
| | MT carbon | parts by mass | 20 | 20 | 20 | 20 | 20 | 20 | 20 | 20 |
| | Calcium hydroxide | parts by mass | 6 | 6 | 6 | 6 | 6 | 6 | 6 | 6 |
| | Magnesium oxide | parts by mass | 3 | 3 | 3 | 3 | 3 | 3 | 3 | 3 |
| | Crosslinking accelerator A | parts by mass | 0.7 | 0.7 | 0.7 | 0.7 | 0.7 | 0.7 | 0.7 | 0.7 |
| | Cross-linking agent-1a | parts by mass | 1.4 | | | | | | | |
| | Cross-linking agent-2 | parts by mass | | 1.4 | | | | | | |
| | Cross-linking agent-3 | parts by mass | | | 1.4 | | | | | |
| | Cross-linking agent-4 | parts by mass | | | | 1.4 | | | | |
| | Cross-linking agent-5 | parts by mass | | | | | 1.4 | | | |
| | Cross-linking agent-6 | parts by mass | | | | | | 1.4 | | |
| | Cross-linking agent-7 | parts by mass | | | | | | | 1.4 | |
| | Cross-linking agent-8 | parts by mass | | | | | | | | 1.4 |
| Cross-linking characteristics | Maximum torque (MH) | dNm | 13.6 | 14.5 | 13.4 | 13.8 | 11.7 | 14.5 | 11.4 | 15.1 |
| | Optimum cross-linking time (T90) | min | 2.7 | 3.4 | 5.6 | 7.5 | 8.3 | 3.6 | 3.2 | 2.2 |
| Physical properties | M100 | MPa | 3.2 | 4.7 | 3.5 | 3.2 | 2.7 | 3.5 | 3.2 | 3.8 |
| | Tensile strength | MPa | 14.2 | 12.8 | 11.3 | 14.5 | 12.6 | 14.3 | 7.9 | 12.1 |
| | Elongation at break | % | 310 | 200 | 240 | 260 | 330 | 230 | 210 | 250 |
| | Hardness | — | 64 | 64 | 63 | 62 | 62 | 63 | 64 | 64 |
| Compression set | (200° C. × 72 hours) | % | 39 | 42 | 44 | 43 | 45 | 51 | 52 | 52 |

TABLE 2

| | | | Example 2 | Comparative Example 8 |
|---|---|---|---|---|
| Compounding | Fluoroelastomer A | parts by mass | 100 | 100 |
| | MT carbon | parts by mass | 20 | 20 |
| | Calcium hydroxide | parts by mass | 6 | 6 |
| | Magnesium oxide | parts by mass | 3 | 3 |
| | Crosslinking accelerator A | parts by mass | 0.7 | 0.7 |
| | Cross-linking agent-1a | parts by mass | 1.3 | |
| | Cross-linking agent-3 | parts by mass | | 1.3 |
| | Sulfolane | parts by mass | 3 | 3 |
| Crosslinking characteristics | Maximum torque (MH) | dNm | 12.5 | 11.8 |
| | Optimum crosslinking time (T90) | min | 1.8 | 3.1 |
| Physical properties | M100 | MPa | 3.5 | 4.4 |
| | Tensile strength | MPa | 12.3 | 10.8 |
| | Elongation at break | % | 240 | 200 |
| | Hardness | — | 64 | 65 |
| Compression set | (200° C. × 72 hours) | % | 33 | 37 |

TABLE 3

| | | | Example 3 | Comparative Example 9 | Comparative Example 10 |
|---|---|---|---|---|---|
| Compounding | Fluoroelastomer A | parts by mass | 100 | 100 | 100 |
| | MT carbon | parts by mass | 20 | 20 | 20 |
| | Calcium hydroxide | parts by mass | 6 | 6 | 6 |

TABLE 3-continued

|  |  |  | Example 3 | Comparative Example 9 | Comparative Example 10 |
|---|---|---|---|---|---|
|  | Magnesium oxide | parts by mass | 3 | 3 | 3 |
|  | Crosslinking accelerator B | parts by mass | 0.6 | 0.6 | 0.6 |
|  | Cross-linking agent-1a | parts by mass | 1.3 |  |  |
|  | Cross-linking agent-3 | parts by mass |  | 1.3 |  |
|  | Cross-linking agent-5 | parts by mass |  |  | 1.3 |
|  | Sulfolane | parts by mass | 3 | 3 | 3 |
| Crosslinking characteristics | Maximum torque (MH) | dNm | 14.0 | 10.4 | 8.8 |
|  | Optimum crosslinking time (T90) | min | 1.9 | 2.6 | 2.8 |
| Physical properties | M100 | MPa | 3.4 | 4.1 | molding impossible due to insufficient vulcanization |
|  | Tensile strength | MPa | 14.6 | 10.4 |  |
|  | Elongation at break | % | 270 | 210 |  |
|  | Hardness | — | 62 | 65 |  |
| Compression set | (200° C. × 72 hours) | % | 24 | 32 | — |

TABLE 4

|  |  |  | Example 4 | Comparative Example 11 |
|---|---|---|---|---|
| Compounding | Fluoroelastomer B | parts by mass | 100 | 100 |
|  | MT carbon | parts by mass | 20 | 20 |
|  | Calcium hydroxide | parts by mass | 6 | 6 |
|  | Magnesium oxide | parts by mass | 3 | 3 |
|  | Crosslinking accelerator C | parts by mass | 0.9 | 0.9 |
|  | Cross-linking agent-1a | parts by mass | 2.5 |  |
|  | Cross-linking agent-3 | parts by mass |  | 2.5 |
|  | Sulfolane | parts by mass | 2 | 2 |
| Crosslinking characteristics | Maximum torque (MH) | dNm | 15.0 | 12.6 |
|  | Optimum crosslinking time (T90) | min | 4.5 | 7.8 |
| Physical properties | M100 | MPa | 5.4 | 5.3 |
|  | Tensile strength | MPa | 10.8 | 9.4 |
|  | Elongation at break | % | 160 | 170 |
|  | Hardness | — | 67 | 67 |
| Compression set | (200° C. × 72 hours) | % | 37 | 41 |

Example 5

In a glass container, 3.00 g (7.71 mmol) of benzyltriphenylphosphonium chloride (BTPPC) was dissolved in 25.0 g of methanol, and 6.50 g (30.6 mmol) of 2,7-dihydroxy-9H-fluoren-9-one was added thereto with stirring at room temperature. The mixture was transferred to an aluminum container and heated on a hot plate at 90° C. with stirring to distill off methanol and concentrate the mixture. The concentrated product was further heated in an oven at 120° C. for 16 hours to dryness to obtain 9.40 g of mixture A, a mixture of 2,7-dihydroxy-9H-fluoren-9-one and BTPPC. The combined recovery of 2,7-dihydroxy-9H-fluoren-9-one and BTPPC was 98.9% by mass. Furthermore, the mass of the solid obtained by heating 1.00 g of mixture A in an oven at 120° C. for 1 hour was also 1.00 g, indicating no change in mass before and after heat treatment.

This mixture A was pulverized in a mortar, and the respective components were compounded according to the formulation in Table 5, and kneaded on an open roll to thereby prepare fluoroelastomer crosslinkable compositions. The maximum torque (MH) and optimum crosslinking time (T90) of the obtained fluoroelastomer crosslinkable compositions are shown in Table 5. Next, the obtained fluoroelastomer crosslinkable compositions were crosslinked by primary crosslinking (press crosslinking) at 180° C. for 20 minutes and secondary crosslinking (oven crosslinking) at 230° C. for 24 hours to obtain crosslinked sheet (thickness: 2 mm) and a small test piece for measurement of compression set. The evaluation results and the compression set test results of the obtained crosslinked sheet are shown in Table 5.

The highest component ratio of 2,7-dihydroxy-9H-fluoren-9-one in mixture A occurs when the entire amount of the feed of 2,7-dihydroxy-9H-fluoren-9-one is recovered, which is 69.1% by mass. Also, the lowest component ratio thereof occurs when all of the unrecovered material is 2,7-dihydroxy-9H-fluoren-9-one, which is 68.1% by mass. Therefore, the amount of 2,7-dihydroxy-9H-fluoren-9-one is 2.17 to 2.20 parts by mass in 3.19 parts by mass of mixture A used in the preparation of the fluoroelastomer crosslinkable compositions.

TABLE 5

|  |  |  | Example 5 |
|---|---|---|---|
| Compounding | Fluoroelastomer A | parts by mass | 100 |
|  | MT carbon | parts by mass | 20 |
|  | Calcium hydroxide | parts by mass | 6 |
|  | Magnesium oxide | parts by mass | 3 |
|  | Mixture A | parts by mass | 3.19 |
|  | Sulfolane | parts by mass | 3 |

TABLE 5-continued

| | | | Example 5 |
|---|---|---|---|
| Crosslinking characteristics | Maximum torque (MH) | dNm | 23.5 |
| | Optimum crosslinking time (T90) | min | 2.8 |
| Physical properties | M100 | MPa | 8.5 |
| | Tensile strength | MPa | 11.3 |
| | Elongation at break | % | 140 |
| | Hardness | — | 76 |
| Compression set | (200° C. × 72 hours) | % | 15 |

As is clear from the results shown in Tables 1 to 5, from the fluoroelastomer crosslinkable composition containing 2,7-dihydroxy-9H-fluoren-9-one, a molded article with excellent compression set characteristics at high temperature is obtained (Examples 1 to 5).

The invention claimed is:

1. A fluoroelastomer crosslinkable composition, comprising:
a polyol-crosslinkable fluoroelastomer (a); and
a cross-linking agent (b),
wherein the cross-linking agent (b) is at least one selected from the group consisting of a compound represented by the following general formula (b) and a salt of the compound with an alkali metal, an alkaline earth metal, or an onium compound,

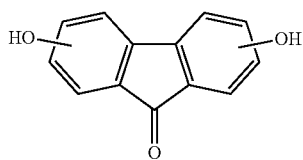

(b)

wherein a hydrogen atom bonded to two benzene rings is optionally replaced with any substituent not containing a halogen atom.

2. The fluoroelastomer crosslinkable composition according to claim 1, wherein the fluoroelastomer (a) contains a vinylidene fluoride unit.

3. The fluoroelastomer crosslinkable composition according to claim 1, wherein a content of the cross-linking agent (b) is 0.1 to 10 parts by mass based on 100 parts by mass of the fluoroelastomer (a).

4. The fluoroelastomer crosslinkable composition according to claim 1, further comprising a crosslinking accelerator (c).

5. The fluoroelastomer crosslinkable composition according to claim 4, wherein a content of the crosslinking accelerator (c) is 0.1 to 10 parts by mass based on 100 parts by mass of the fluoroelastomer (a).

6. The fluoroelastomer crosslinkable composition according to claim 1, further comprising an acid acceptor (d).

7. The fluoroelastomer crosslinkable composition according to claim 6, wherein a content of the acid acceptor (d) is 0.1 to 50 parts by mass based on 100 parts by mass of the fluoroelastomer (a).

8. The fluoroelastomer crosslinkable composition according to claim 6, wherein the acid acceptor (d) is at least one selected from the group consisting of metal oxides, metal hydroxides, alkali metal silicates, weak acid metal salts and hydrotalcite.

9. The fluoroelastomer crosslinkable composition according to claim 1, wherein the cross-linking agent (b) is at least one selected from the group consisting of 2,7-dihydroxy-9H-fluoren-9-one and a salt of 2,7-dihydroxy-9H-fluoren-9-one with an alkali metal, an alkaline earth metal, or an onium compound.

10. The fluoroelastomer crosslinkable composition according to claim 1, further comprising a dialkyl sulfone compound.

11. A molded article obtained from the fluoroelastomer crosslinkable composition according to claim 1.

* * * * *